United States Patent [19]

Ogawa

[11] Patent Number: 4,562,111
[45] Date of Patent: Dec. 31, 1985

[54] VARIOUS-COVERS AND METHOD FOR PRODUCING SAME

[75] Inventor: Naoki Ogawa, Yokosuka, Japan

[73] Assignee: Nissan Motor Co., Ltd., Yokohama, Japan

[21] Appl. No.: 361,260

[22] Filed: Mar. 24, 1982

[30] Foreign Application Priority Data

Mar. 26, 1981 [JP] Japan ................................. 56-44520

[51] Int. Cl.[4] ............................................ D04H 1/58
[52] U.S. Cl. .................................. 428/289; 428/288; 428/290; 428/492; 428/496
[58] Field of Search ............... 428/289, 492, 290, 291, 428/496, 263; 156/62.2

[56] References Cited

U.S. PATENT DOCUMENTS 2,838,436  6/1958  Clingman .......................... 428/492
3,547,764 12/1970  Amerongen ....................... 428/492
4,119,746 10/1978  Bleyle ................................ 428/290

FOREIGN PATENT DOCUMENTS 1219023 1/1971 United Kingdom .
2052388 1/1981 United Kingdom .
2052355 1/1981 United Kingdom .
0794032 1/1981 U.S.S.R. ............................ 428/492

Primary Examiner—James J. Bell
Attorney, Agent, or Firm—Schwartz, Jeffery, Schwaab, Mack, Blumenthal & Evans

[57] ABSTRACT

A cover for use in connection with an engine, comprises a layer formed of fibrous composite containing fiber material, and synthetic rubber and its cross linking agent, the fibrous composite layer being impregnated with rubber material, thereby greatly improving the noise reduction effect of the cover.

9 Claims, 15 Drawing Figures

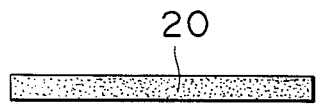
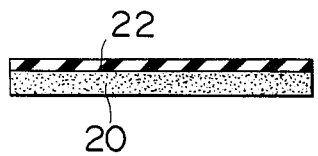
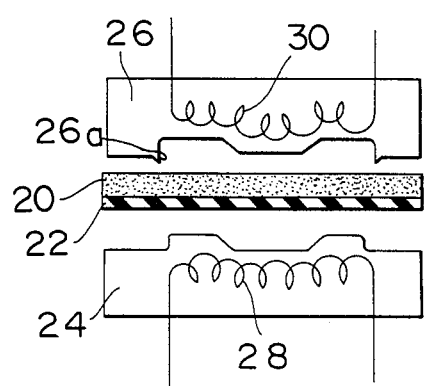
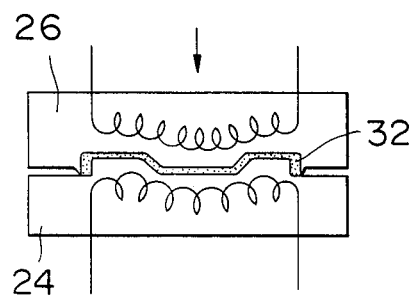
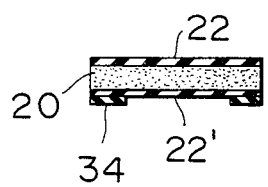
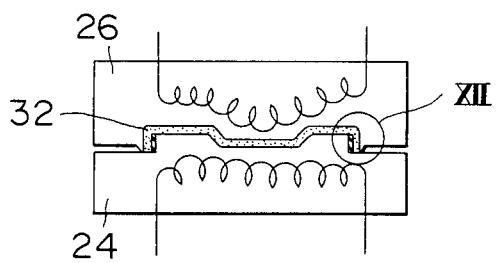
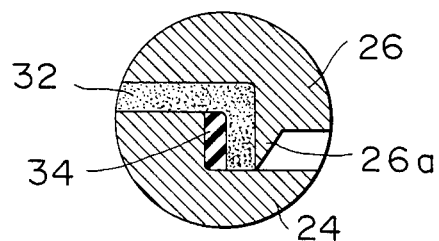

FIG.13
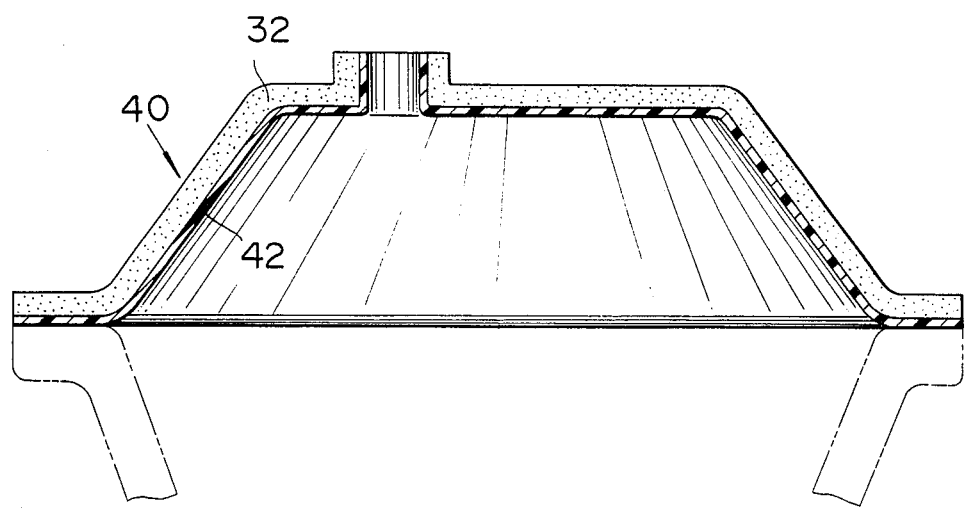
FIG.14 FIG.15
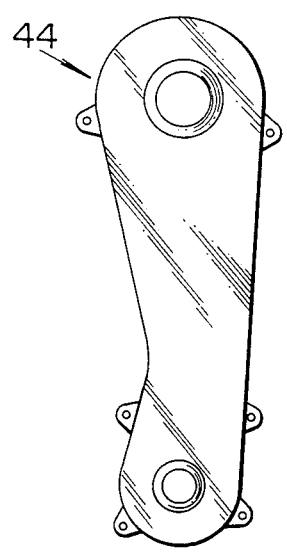 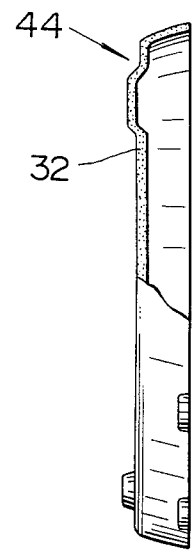

VARIOUS-COVERS AND METHOD FOR PRODUCING SAME

BACKGROUND OF THE INVENTION

1. Field of the Invention

The present invention relates to various covers for use in connection with an engine and methods for producing the same, and more particularly to the covers which are formed of new material to improve the noise reduction thereof.

2. Description of the Prior Art

As various covers for use in connection with an internal combustion engine, there are, for example, rocker covers (cylinder head covers), front covers, dust covers, undercovers, engine air filter casings and their covers, noise reducing covers located in the vicinity of the outer surface of the engine, oil pans to be filled with engine lubricating oil, and hood-insulators.

Heretofore, these covers have been formed of sheet metal or plastics and therefore tend to easily transmit vibration therethrough. As a result, these covers are excited to vibrate by the vibrations due to engine running and due to intake air pulsation. This causes, for example, the air filter or the dust cover to generate sound, thereby increasing engine noise.

SUMMARY OF THE INVENTION

According to an aspect of the present invention, a cover for use in connection with an engine, comprises a layer formed of fibrous composite containing fiber material, and synthetic resin and its cross linking agent. Additionally, the fibrous composite layer is impregnated with rubber material. This cover is very high in noise reduction effect particularly by virtue of the rubber material containing the fibrous composite.

According to another aspect of the present invention, the above-mentioned cover is produced by a method comprising the following steps of: (1) mixing synthetic resin and its cross linking agent into fiber material; (2) forming a fibrous composite layer by preliminarily heating the mixed fiber material, synthetic resin and cross linking agent; (3) superposing a sheet of unvulcanized rubber material on the fibrous composite layer; and (4) forming, under pressure and heat the superposed fibrous composite layer and rubber material sheet into a predetermined shape of a cover.

DESCRIPTION OF THE DRAWINGS

The features and advantages of the cover and the method for producing the same according to the present invention will be more clearly appreciated from the following description taken in conjunction with the accompanying drawings in which like reference numerals designate corresponding parts and elements, and in which:

FIGS. 6 to 9 are schematic sectional illustrations showing an embodiment of a method of producing the cover, in accordance with the present invention;

FIGS. 10 and 11 are schematic sectional illustrations showing another embodiment of the method of producing the cover, in accordance with the present invention;

FIG. 12 is a fragmentary enlarged view of a part enclosed by a line XII of FIG. 11;

FIG. 13 is a vertical cross-sectional view of a rocker cover, which is another embodiment of the cover in accordance with the present invention;

FIG. 14 is a front elevation of a dust cover which is a further embodiment of the cover in accordance with the present invention; and FIG. 15 a right side view, partly in section, of the duct cover of FIG. 14.

DETAILED DESCRIPTION OF THE INVENTION

Figure 1:
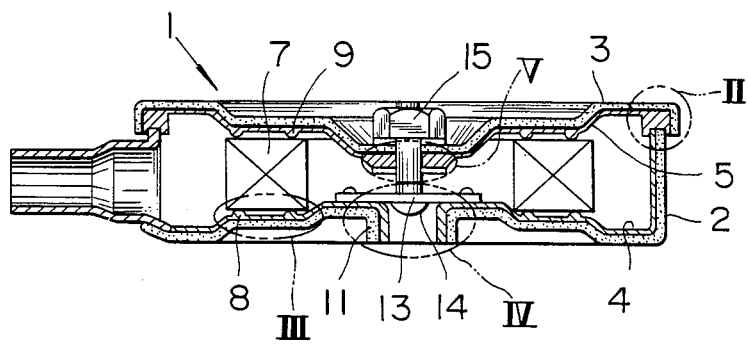
FIG. 1 is a vertical cross-sectional view of an air filter assembly which includes an embodiment of covers in accordance with the present invention.
Figure 2:
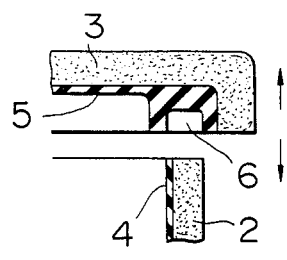
FIG. 2 is a fragmentary enlarged sectional view of a part enclosed by a line II of FIG. 1.

Referring now to FIGS. 1 to 5, there is shown an engine air filter 1 for filtering intake air for an internal combustion engine (not shown). The air filter 1 comprises a casing 2 and a cover 3 which are of an embodiment of the present invention. The casing 2 is provided at its inner surface with an oil-tight seal layer 4 made of, for example, rubber to obtain vibration-insulating and sealing ability. The cover 3 is also provided at its inner surface with a similar oil-tight seal layer 5. As best shown in FIG. 2, the oil-tight seal layer 5 on the cover side is formed with a groove 6 to which the upper peripheral end section of the united casing and oil-tight seal layer 2, 4 fits. It will be understood that a section of the oil-tight seal layer 5 around the groove 6 is formed thick as compared with other sections in order to obtain a higher strength.

Figure 3:
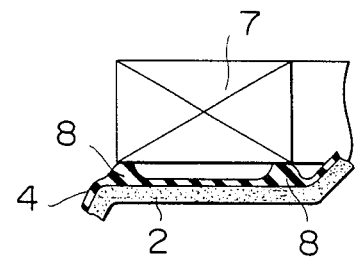
FIG. 3 is a fragmentary enlarged sectional view of a part enclosed by a line III of FIG. 1.
Figure 4:
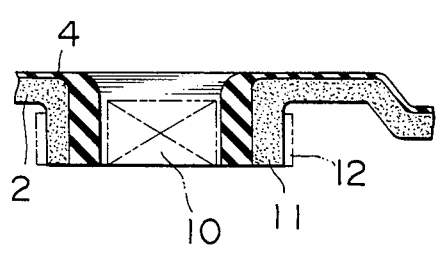
FIG. 4 is a fragmentary enlarged sectional view of a part enclosed by a line IV of FIG. 1.
Figure 5:
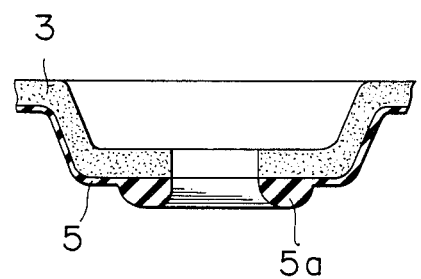
FIG. 5 is a fragmentary enlarged sectional view of a part enclosed by a line V of FIG. 1.

An air filter element or filter media 7 is disposed within the casing 2 and located between the casing side oil-tight seal layer 4 and the cover side oil-tight seal layer 5. Additionally, the air filter element 7 is elastically supported by annular projections 8, 9 of the oil-tight seal layers 4, 5 as shown in FIGS. 1 and 3. The casing 2 is formed at its central part with a pipe-like section 11 to be connected with a carburetor 10. The pipe-like section is surrounded by a band 12 in order to fix it onto the carburetor 10 as shown in FIG. 4. The oil-tight seal layer 4 is formed thicker at a section inside the pipe-like section 11 for the purpose of reinforcement thereof. Additionally, an elongate stay 13 is secured at the bottom inner surface of the casing 2 in such a manner as to bridge over the opening of the pipe-like section 11. A bolt 14 is passed through the stay 13 from the direction of the pipe-like section 11 and further passed through the central section of the cover 3 to be screwed in a nut 15 on the cover 3. It will be understood that the cover 3 is secured onto the casing 2 by this bolt-nut connection. As shown in FIG. 5, the cover side oil-tight seal layer 5 is formed thicker at a section 5a around an opening (no numeral) through which the bolt 14 passes, so that the thicker section 5a serves as a seat for supporting the bolt 14 in vibration-insulating manner.

It will be appreciated that since the oil-tight seal layers 4, 5 are formed with the thicker portions at suitable locations as discussed above, they serve also as installation seats and packings. As a result, it becomes unnecessary to use independent installation seats and packings, thereby decreasing the number of parts and facilitating the assembly thereof.

The method of producing the cover 3 will be discussed hereinafter with reference to an embodiment of the present invention shown in FIGS. 6 to 9. It will be understood that the casing 2 can be produced in the similar method.

First, a plate-like fibrous composite or material 20 as shown in FIG. 6 is prepared. The preparation of the fibrous composite 20 is made by mixing synthetic resin such as phenol resin and its cross linking agent such as formalin into organic fiber such as wool, cotton, acetate fiber, polyester fiber or the like, or inorganic fiber such as glass wool, rock wool or the like, and thereafter by forming the thus obtained mixture into the shape of a plate upon heating at a temperature ranging from 150° to 170° C. It will be understood that the resulting plate-shape fibrous composite 20 is convenient for its treatment, particularly for the transportation, and additionally is facilitated in its trimming.

Subsequently, a thin sheet of unvulcanized rubber material 22 is superposed on the thus obtained plate-shape fibrous composite 20, and thereafter the thus superposed fibrous material and rubber material 20, 22 are put on a lower press die 24 as shown in FIG. 8. An upper press die 26 is movably disposed over the lower press die 24. Additionally, the lower and upper press dies 24, 26 are provided therein with heating devices 28, 30 such as electric heaters, respectively. The upper press die 26 is formed with an edge (tooth) portion 26a for trimming a press-formed product during press-forming upon heating.

Thereafter, as best shown in FIG. 9, the superposed fibrous composite plate and rubber material 20, 22 are formed in a predetermined shape under pressure and upon heating. As a result, the fibrous composite 20 is impregnated with the unvulcanized rubber material 22 by virtue of the pressure. Furthermore, the cross linking reaction of the synthetic resin and the vulcanization reaction of the rubber material take place within the fibrous composite 20, thus resulting in new fibrous composite or material 32 which has been formed into the shape of the above-mentioned cover 3 while containing the rubber material 22 therein.

It will be appreciated from the above, that the thus formed cover 3 is high in damping capacity while obtaining stable quality in products as a result of being impregnated with the rubber material 22. It will be understood that the oil-tight seal layer 4 etc. are installed in separate processes.

FIGS. 10 to 12 illustrate another embodiment of the production method of the cover 3, in accordance with the present invention. In this method, upper and lower unvulcanized rubber materials 22, 22' in the sheet form are respectively superposed on the upper and lower-side surfaces of the plate-shape fibrous composite 20, in which the lower rubber material 22' is provided with an independent rubber layer 34. Otherwise, the rubber layer 34 may be integral with the lower rubber material 22'. In this connection, the lower press die 24 is so shaped that a clearance for the rubber layer 34 is formed between the surface of the lower press die 24 and the new fibrous composite 32 during the formation of the product as shown in FIGS. 11 and 12. Accordingly, when the superposed fibrous composite and rubber materials 20, 22, 22' (shown in FIG. 10) are formed into a predetermined shape under pressure and upon heating, the new fibrous composite 32 containing the rubber material is obtained with the rubber layer 34 which may be integral with the fibrous composite 32. This rubber layer 34 serves as a sealing member and/or a packing for supporting in an insulating manner, and therefore it becomes unnecessary to prepare separate and independent packings and supporting seats for vibration-insulation.

FIG. 13 shows another embodiment of the cover according to the present invention, in which a rocker cover or cylinder head cover 40 is formed of the new fibrous composite 32. Besides, an oil-tight seal layer 42 formed of rubber or synthetic resin film is superposed on the inner surface of the rocker cover 40.

FIGS. 14 and 15 show a further embodiment of the cover of the present invention, in which a dust cover 44 such as a front timing chain cover is formed of the new fibrous composite 32.

As appreciated from the above, according to the present invention, the fibrous composite or material is impregnated with unvulcanized rubber material during the press-forming upon heating in which the cross linking reaction of the synthetic resin and the vulcanization reaction of the rubber material take place within the fibrous composite, thus obtaining various covers formed of the new fibrous composite containing the rubber material and greatly improved in noise reduction effect.

What is claimed is:

1. A cover for use in connection with an engine, comprising a fibrous composite layer which includes a fiber material, a synthetic resin, a cross-linking agent for cross-linking said resin and an impregnated rubber material, said rubber material being dispersed essentially throughout said composite layer.

2. A cover as claimed in claim 1, wherein said fibrous composite layer is formed by mixing said synthetic resin and cross linking agent into said fiber material, and thereafter by initially heating the mixture of said fibrous material, synthetic resin and cross linking agent.

3. A cover as claimed in claim 1, said fibrous composite layer is impregnated with said rubber material by impregnating unvulcanized rubber material under pressure, thereafter by vulcanizing said rubber material upon heating.

4. A cover as claimed in claim 3, wherein said fibrous composite layer is formed by solidifying said synthetic resin upon the cross linking reaction of said synthetic resin by heating.

5. A cover as claimed in claim 1, wherein said fiber material is at least one of the group consisting of an organic fiber and an inorganic fiber.

6. A cover as claimed in claim 5, wherein said an organic fiber is at least one of the group consisting of wool, cotton, acetate fiber, and polyester fiber.

7. A cover as claimed in claim 5, wherein said inorganic fiber is at least one of the group consisting of glass wool, and rock wool.

8. A cover as claimed in claim 1, wherein said synthetic resin is a thermosetting resin.

9. A cover as claimed in claim 8, wherein said thermosetting resin is phenol resin, in which said cross linking agent is formalin.

* * * * *